No. 867,406. PATENTED OCT. 1, 1907.
L. T. PATES.
RAIL BOND.
APPLICATION FILED DEC. 28, 1906.

Witnesses
C. N. Walker
Albert Popkins

Inventor
Lewis T. Pates
By Geo. H. Evans
Attorney

UNITED STATES PATENT OFFICE.

LEWIS T. PATES, OF UPPER ALTON, ILLINOIS.

RAIL-BOND.

No. 867,406.   Specification of Letters Patent.   Patented Oct. 1, 1907.

Application filed December 26, 1906. Serial No. 349,561.

To all whom it may concern:

Be it known that I, LEWIS T. PATES, a citizen of the United States, residing at Upper Alton, in the county of Madison and State of Illinois, have invented certain new and useful Improvements in Rail-Bonds, of which the following is a specification.

My invention relates to rail bonds for electrically connecting railroad rails.

Figure 1:
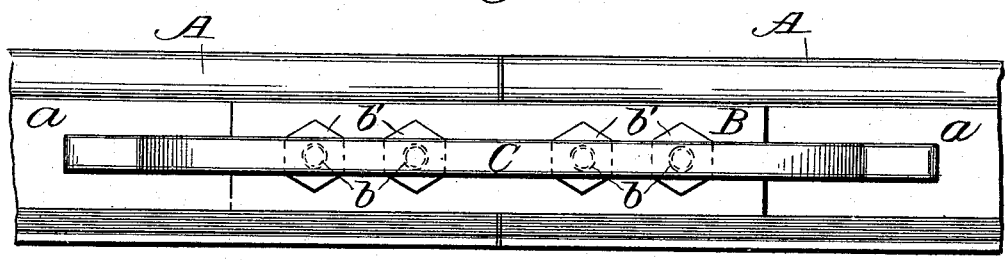
Figure 2:
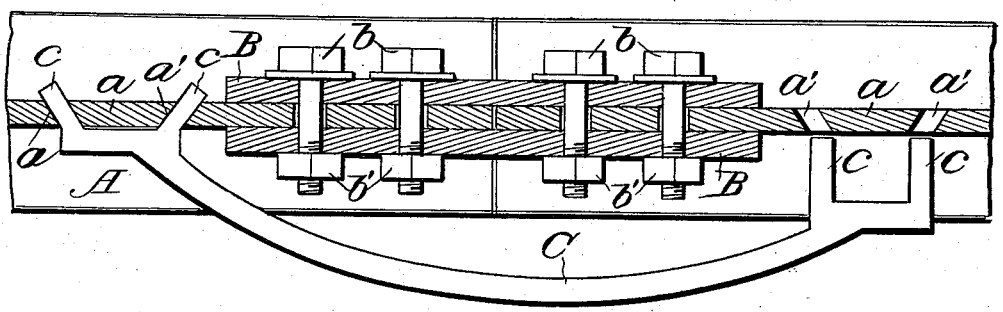
Figure 3:
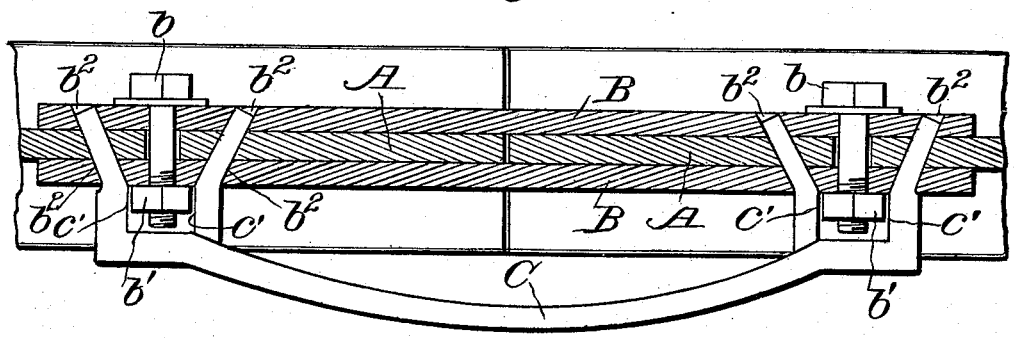

The objects of my invention are to provide a rail bond in which the ends of the bond are caused to be spread in divergent directions in the act of forcing them into the apertures in the rail ends; thus doing away with the necessity of upsetting or the employment of other means for securing the bond firmly against accidental displacement; also to provide the rail bond with pairs of prongs spaced apart to straddle the bolt nuts and so lock them against displacement after the prongs have been driven into the rail openings and spread apart. These objects I accomplish by means of the construction shown in the accompanying drawings in which:

Figure 1 is a side elevation of a rail joint having my improved rail bond applied; Fig. 2 is horizontal section therethrough showing one end of the rail bond in place and the other end ready to be driven into place; Fig. 3 is a similar view showing a modified form of rail bond.

A, A designate the rail ends, B, B, the fish plates, $b$, the bolts and $b'$, the nuts.

The webs $a$, $a$ of the rails are provided with pairs of oppositely inclined perforations $a'$, $a'$, just beyond the fish plates.

C, designates the curved flexible connector or body of the rail bond provided at the inner side of its ends with pairs of prongs $c$, $c$, adapted to be driven or forced into the perforations $a'$, whereby the prongs of each pair are bent or spread oppositely as shown at the left of Fig. 1 and so firmly locked in place.

The curvature of the rail bond allows it to cross over the several bolts and also allows of the expansion and contraction necessary in such devices. The bond is formed of highly conductive material.

In Fig. 3, the apertures of each pair not only incline in opposite directions as in Figs. 1 and 2, but they register with similarly inclined apertures or perforations $b^2$, $b^2$, in both fish plates and the prongs $c$, $c$ are extended so as to form nut embracing jaws $c'$, $c'$, at their inner ends. In this construction the fish plates are very securely held to the rails as the prongs $c$, $c$ pass through the apertures in the fish plates as well as those in the rails.

The forcing of the prongs into the oppositely inclined holes, which are of a size to cause a very close union of the parts, also prevents the entrance of substances likely to cause an impairment of the bond as a conductor of electricity.

What I claim is:

1. A rail bond comprising a connector formed at the inner side of each of its ends with a pair of integral prongs adapted to be laterally deflected for the purpose set forth.

2. A rail bond provided at the inner side of its ends with pairs of nut embracing jaws and prongs projecting from the inner ends of the jaws.

3. The combination with the rail ends each having an inclined aperture formed complete in the body of the metal, of a rail bond comprising a connector provided with prongs at its ends forced into said apertures and bent thereby, whereby the separation of the rail ends can not effect the displacement of the prongs.

4. The combination with rail ends having pairs of oppositely inclined apertures, of a rail bond comprising a connector having pairs of prongs forced into said apertures and bent in opposite directions thereby.

5. The combination with rail ends having inclined apertures in their webs, of a rail bond comprising a connector having prongs at its ends forced into said apertures and bent thereby, against displacement.

6. The combination with rail ends having pairs of apertures the aperture of each pair being oppositely inclined, of a rail bond comprising a connector having pairs of prongs forced into said apertures and bent correspondingly thereby.

7. The combination with rail ends, fish plates, bolts and nuts; the plates and the rail webs having pairs of registering apertures at opposite sides of said bolts, of a rail bond having pairs of nut engaging jaws at its ends and a prong projecting from every jaw and adapted to be forced into the apertures.

8. The combination with rail ends, fish plates, bolts and nuts; the plates and rail webs having pairs of registering inclined apertures at opposite sides of the bolts, of a rail bond having pairs of nut engaging jaws at its ends and a prong projecting from every jaw and adapted to be forced into the apertures and bent apart.

In testimony whereof I affix my signature, in presence of two witnesses.

LEWIS T. PATES.

Witnesses:
BLANCHE E. HENESEY,
JAMES T. MENIFEE.